United States Patent [19]

Holzbrecher

[11] 4,031,562

[45] June 21, 1977

[54] DEVICE FOR CREATING A DISPLAY OF A VARIABLE, THE VALUE OF WHICH IS DIGITALLY ENCODED

[75] Inventor: Horst Holzbrecher, Julich-Bourheim, Germany

[73] Assignee: Kernforschungsanlage Jülich Gesellschaft mit beschrankter Haftung, Julich, Germany

[22] Filed: Nov. 12, 1975

[21] Appl. No.: 631,380

[30] Foreign Application Priority Data
Nov. 13, 1974 Germany .......................... 2453752

[52] U.S. Cl. .................................. 346/35; 346/66
[51] Int. Cl.² .......................................... G01D 9/06
[58] Field of Search ................. 346/35, 67, 66, 61, 346/141, 49

[56] References Cited
UNITED STATES PATENTS

| | | | |
|---|---|---|---|
| 1,952,991 | 3/1934 | Kolff | 346/35 |
| 2,516,217 | 7/1950 | Keinath | 346/35 X |
| 2,802,049 | 8/1957 | Masterson | 178/28 |
| 2,895,783 | 7/1959 | Cohen | 346/66 X |
| 3,059,237 | 10/1962 | Kolb | 346/35 X |
| 3,214,764 | 10/1965 | Williams | 346/49 |
| 3,389,397 | 6/1968 | Lex et al. | 346/35 |

Primary Examiner—Joseph W. Hartary
Attorney, Agent, or Firm—Walter Becker

[57] ABSTRACT

A device for creating a display of a variable, the instantaneous values of which are converted into a digital voltage signal which is encoded into a code created in conformity with a numerical system such as the decimal system or the octal system. The encoded signals are supplied to a control circuit which determines the highest value signal and processes this signal with signals from at least the next low valued group of signals.

3 Claims, 7 Drawing Figures

FIG. 1
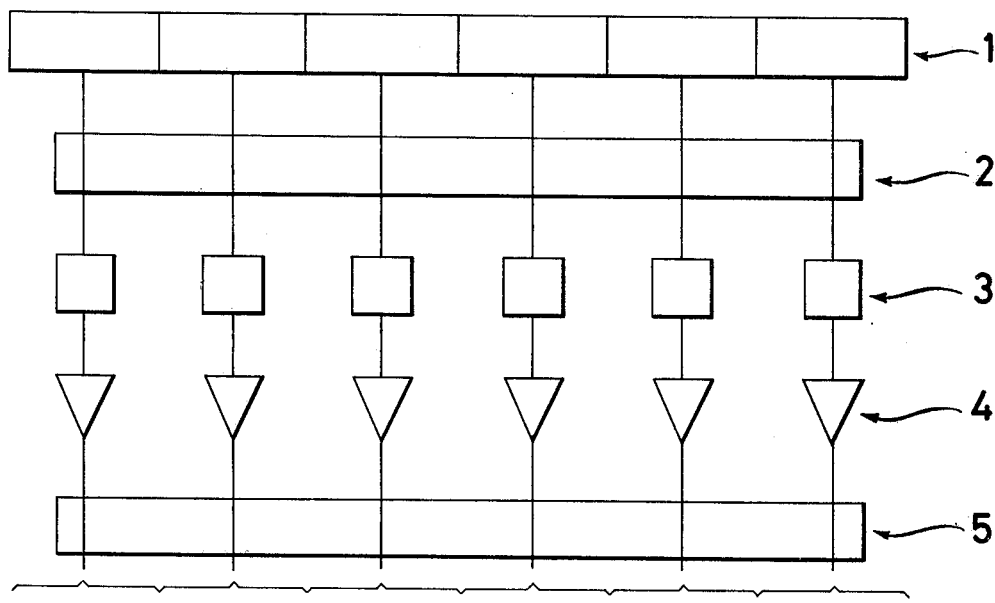
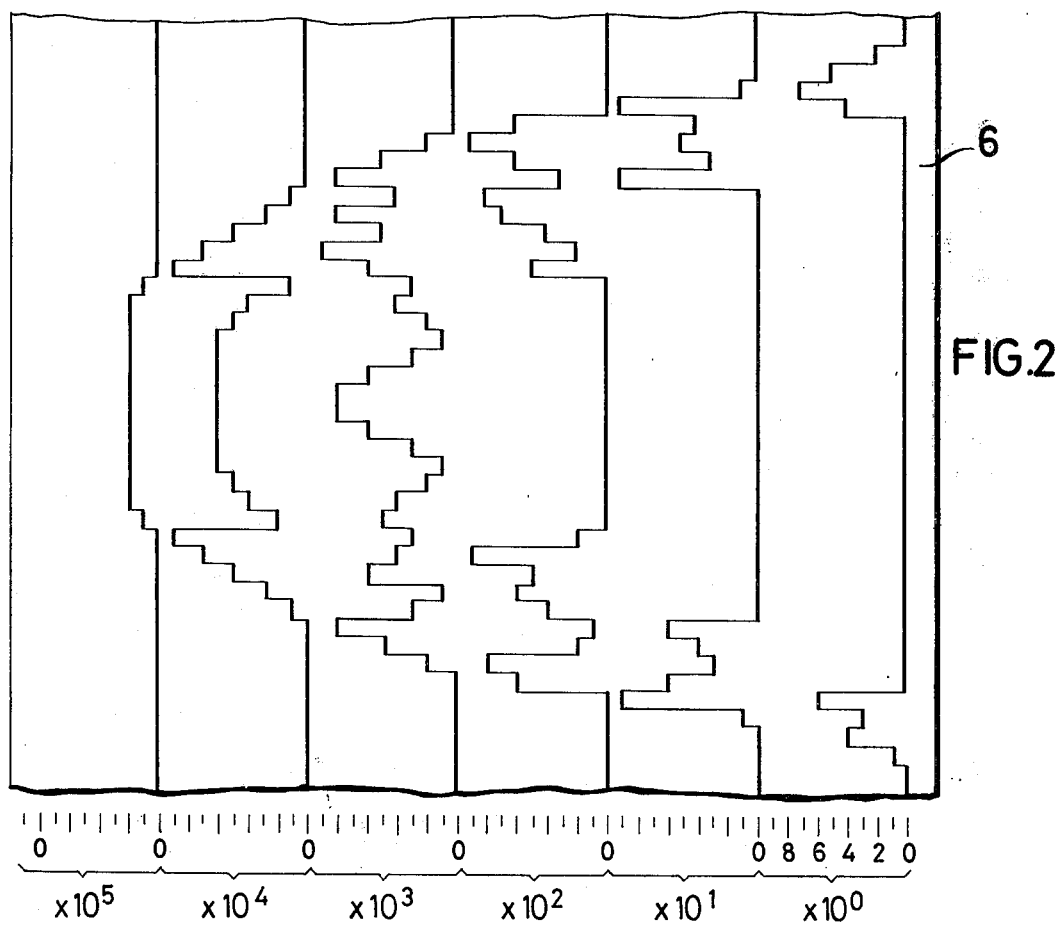
FIG. 2

DEVICE FOR CREATING A DISPLAY OF A VARIABLE, THE VALUE OF WHICH IS DIGITALLY ENCODED

The present invention relates to a device for registering a measured variable transformed into a digital voltage or current signal while the digital signal is coded into a code that is made up in conformity with a predetermined numerical system such as the decimal system or the octal system. The digital system consists of individual signal which correspond to the groups of the predetermined numerical system such as the decades of the decimal system or the octal groups of the octal system.

Devices for registering measured variables have to meet particular requirements, especially when the measured variable to be registered passes during the measuring operation through a plurality of magnitudes while all values of the measured variable, including the small columns or digits of the measured variable are to be registered with sufficient precision. This is the case for instance when registering measured values in the masspectroscopy, in the gammaspectroscopy or also in the gaschromatography where the measured variable has greatly pronounced maxima. Particular requirements have to be met by the registration of a measured variable also when a precise registering of the changes in the measured variable are desired, which changes, however, with regard to the value of the measured variable are by themselves rather small.

The state of the art also includes to register a measured variable in the form of an analogous signal by means of a device the linear measuring range of which is prior to the measuring operation proper set to the maximum value of the measured variable. To this end, it is necessary to know the magnitude of the measured variable prior to the measuring operation proper in order to avoid that a measuring range is set which is not sufficiently precise for the measured variable. Inasmuch as this is not always possible, a device of this type cannot always be used. Moreover, by means of these known devices it is not always possible to register changes in the measured variable which are located within the range or even below the solving limit of the devices.

There have furthermore become known registering devices in which the measured variable is illustrated in a graph or curve with logarithmic scale. While with these devices it is not necessary to set the device to the measured variable, but is a disadvantage that the registered measured variable can only under difficulties and only with approximate precision be read from the curve drawn by the device.

There have furthermore become known devices where a linear measuring range in which during the measuring, the measuring range is automatically shifted over as soon as the measured variable exceeds the set measuring range. In this way it will be realized that also small measured variables can be registered with sufficient precision. However, the curves registered during the measuring operation which curves illustrate the measured variable in different ranges, are greatly affected by the frequent shifting over. The reading of the measured variable is therefore in such instances rather difficult and time consuming with these heretofore known devices.

Devices for registering measured variables have become known in which the signal of the measured variable is simultaneously conveyed to a plurality of channels with linear measuring ranges of different sensitivity. While these devices make it possible without automatically shifting the measuring range, that the measured variable is always illustrated in a corresponding measuring range, this type of devices for registering measured variables which vary over a plurality of magnitudes are not usable for practical purposes since they require too many technical elements. Moreover, with this device it is not possible to register small changes in the measured variable which are located within the range or even below the solving limit of the device.

For purposes of registering measured variables which are present as digital signals, for instance in the form of a signal coded in the binary-decimal-code, the signals are frequently first analogized and subsequently conveyed to a device for registering analogous signals. Such an arrangement, however, has the drawback that the precision of the digital measured signal is lost. While this drawback is avoided by non-digital devices in which the measured variable conveyed as digital signal to the device is printed as a numerical value, this device has the drawback that the illustration of the course of the measured value in the produced number columns is not very illustrative. The greatest and smallest changes in the measured variable can therefore be ascertained from the number columns only under great difficulties.

It is, therefore, an object of the present invention to provide a device for registering a measured variable, which will make is possible to register a measured variable which is variable over a plurality of magnitudes, and also to register very small changes in magnitude in a numerical system, in such a way that from the registration effected by the device, any value of the measured variable can be read with sufficient precision while simultaneously also the course of the measured variable as well as minor changes in the latter can easily be recognized.

These objects and other objects and advantges of the invention will appear more clearly from the following specification in connection with the accompanying drawings, in which:

FIG. 1 diagrammatically illustrates an apparatus with a writing instrument comprising a device which precedes the apparatus and is adapted to register an exit for the individual signals of a signal that is coded in the binary decimal code.

FIG. 2 shows a portion of a writing strip with registration of a signal illustrated in the decimal system.

Figure 5:
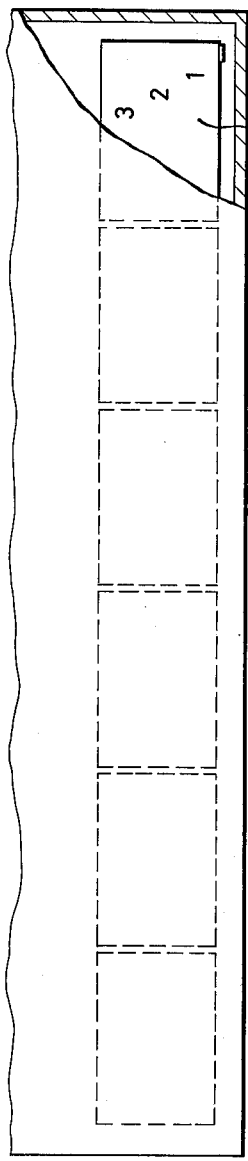

FIG. 5 diagrammatically illustrates the principle of a printing machine.

Figure 6:
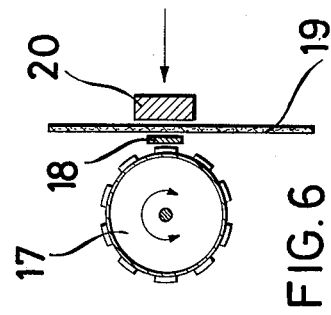

FIG. 6 is a side view of the printing mechanism of FIG. 5.

Figure 7:
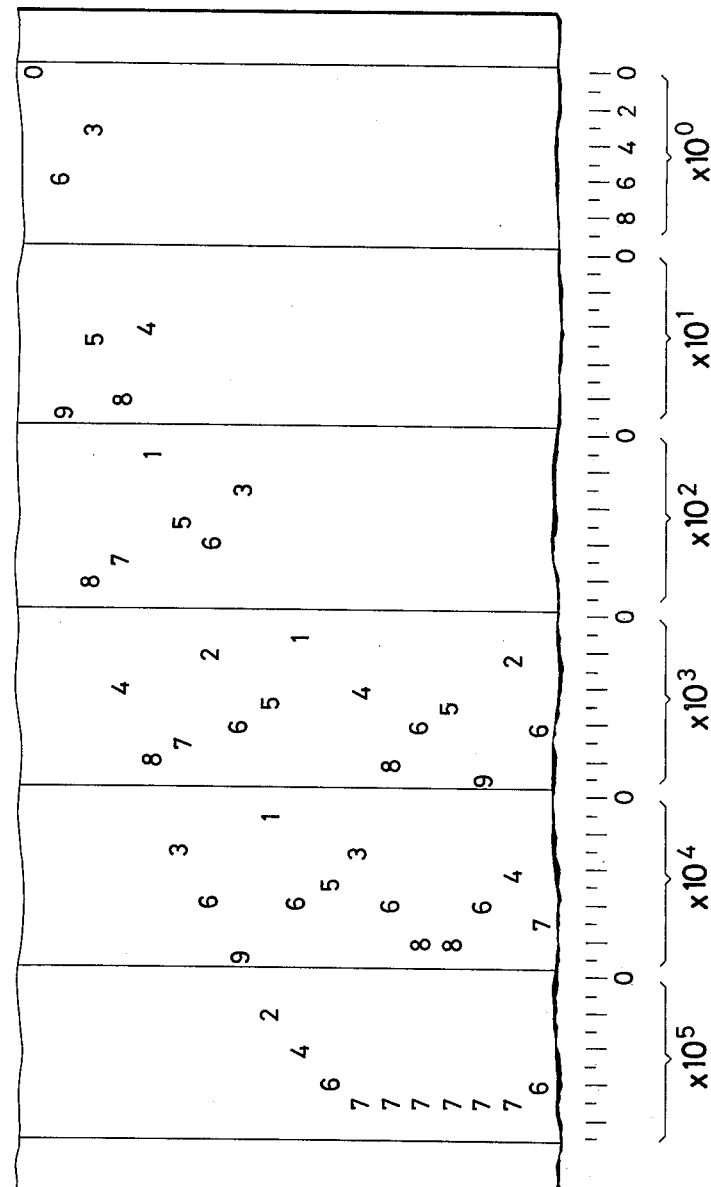

FIG. 7 illustrates a portion of a printing strip with registration of a signal illustrated in the decimal system.

The object according to the present invention has been realized by the fact that a device of the above mentioned general type is formed by a printing mechanism which receives the digital individual signals for illustrating the digital signal of a number sequence corresponding to a predetermined number system. In this printing mechanism the number signs arranged on printed forms are arranged adjacent to each other in a sequence which corresponds to the valence or value of the groups of the predetermined number system as well as to the valence or value of the printed numbers within the groups of the predetermined number system. Such an arrangement makes it possible that each numeral of the printed number is positioned in a partial range provided for the respective group of the predetermined numerical system, on printing strips in conformity with its valence within the group. Since furthermore the groups are arranged in conformity with their sequence in the predetermined numerical system, each printed numeral has a special position from which in addition to the numerical itself, the value of the number can be recognized. The printed numerals thus form a bundle of curves from which for instance the position as well as the value of the extreme values of the measured variable can easily be read. Another modification of the present invention consists in that an apparatus of the above mentioned type is formed by a writing instrument which is adapted to graphically illustrate analogous voltage or current signals and which comprises a plurality of curve writers respectively provided with a device for amplifying analogous voltage or current signals. A control arrangement analogizing the digital individual signals precedes the devices for amplifying analogous voltage or current signals which last mentioned devices precede the curve writers. The curve writers for illustrating the digital voltage or current signals are in the predetermined numerical system arranged adjacent to each other in a sequence which corresponds to the valence of the groups of the predetermined numerical system and are so designed that the values of the analogized individual signals are linearly illustrated. Analogously to the device with a printing mechanism, also with the device equipped with a writing instrument, the lines or points registered by the individual curve writers are in conformity with the values associated therewith positioned on the writing strip within the group of the predetermined numerical system on a partial range provided for the respective group. For each ascertained value of the measured variable, a line or a number of points is registered while the length of the lines or the number of the points corresponds to the measuring time to which the measured value relates. With a measured variable which has changed during the measuring operation thus a bundle of curves is formed composed of stepped curves. Inasmuch as the curve writers according to the invention are arranged in conformity with the sequence of groups in the predetermined numerical system, every number reflecting the value of the measured variable can in the predetermined numerical system be read from the position of the curves registered or written by the curve writers.

An expedient design of the apparatus according to the invention employing a printing device consists in that a printing device is provided which comprises a plurality of printing forms arranged in a sequence which corresponds to the valence of the groups of the predetermined numerical system and which is provided with numerical indications arranged in equal distances from each other on the printing forms and pertaining each to a group of the predetermined numerical system. In said printing device or printing system according to the invention, the printing forms are movable independently of each other with a step width corresponding to the distances between the numerical indications. The numerical indications are arranged in a sequence corresponding to the valence of said numerical indications in the predetermined numerical system and are equally spaced from each other and are laterally offset relative to each other with regard to the direction of movement of said printing forms. Another expedient design of the apparatus according to the invention consists in that the printing forms are designed as rollers rotatably arranged adjacent to each other and comprising the numerical indications of a group of the predetermined numerical system. The numerical indications are arranged on said rollers in a sequence corresponding to their valence in the group and are offset in the form of a helical line on the surface of the roller.

A further very expedient design of the apparatus according to the invention using a writing instrument consists in that the curved writing instrument consists of mirror galvanometers. Inasmuch as mirror galvanometers permit a quick indication of changing measured variables, a precise indication of the measured variable is made possible in this way.

If the lowermost values of the number representing the measured value are only of statistical importance, it has proved advantageous to see to it that the control arrangement which analogizes the digital individual signals is preceded by a control arrangement which selects the digital individual signals corresponding to the highest value groups of the predetermined numerical system, and which conveys the selected digital individual signals to the control arrangement which analogizes the individual signals. In this way it will be assured that the graphic recording will have the necessary and satisfactory precision while the course of the measured variable is illustrated in a clearly easily recognizable manner.

If the measured variable at the exit of the measuring device measuring the variable to be measured is obtained as an analogous signal or as a signal which is coded in a numerical system other than the desired numerical system, it is, of course, possible in a manner known per se to re-code the signal in a corresponding manner. In this connection it may be expedient to do this by means of a control arrangement provided in the apparatus.

According to the diagrammatical sketch of FIG. 1 showing the principle of the invention, the individual signals of the signal which is coded in the BCD code (binary decimal code) and contains the numerical information and in which individual signals occur at the exit of six decades of an apparatus 1, are received by a control arrangement 2 which serves the automatic selection of the respective highest value individual signal. As apparatus 1 there is employed an apparatus which is generally designated as "rate meter" in which the number of the impulses indicating the measured variable is averaged over a predetermined time. However, any other digital measuring device with a corresponding exit can be employed. The individual signals selected in the control arrangement 2 and corresponding to the highest value decades of the signal are conveyed to the control arrangement 3 for analogization. The analogized individual signals are then through the intervention of an amplifier 4 conveyed to the curved writing instruments 5 arranged in a decade manner and are registered on the writing strip 6 (FIG. 2) by means of the curve writing instrument. The individual signals are expediently in the control arrangement 3 so transformed that the individual signals will be obtained at the exit of the control arrangement in the form of signals analogized in steps. If for instance the voltage range of the analogized individual signals amounts to 9 volts, the number 1 within a decade corresponds to a voltage step of one volt. For instance, three volts will then correspond to the number 3.

As will be evident from FIGS. 1 and 2, with the device of the invention illustrated diagrammatically, respectively only the three highest decades of the measured variable are recorded on the writing strip. The curve writing instruments below the respective three highest value decades record in a straight line, the 0. As will further be seen from the recording on the writing strip in FIG. 2, the maximum is readable up to the third digit.

Figure 3:
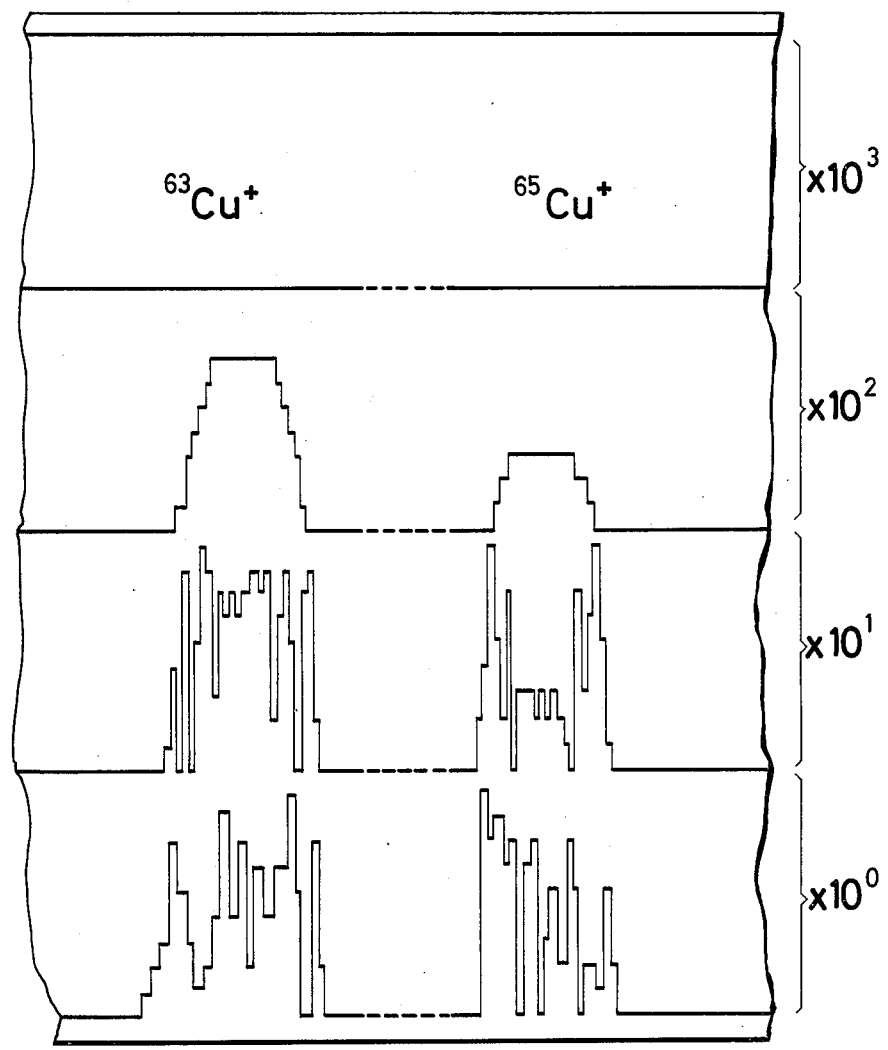
FIG. 3 shows a portion of a writing strip with registration of a masspectrogram illustrated in the decimal system.

FIG. 3 shows a writing strip which has been recorded by means of a device illustrated in principle in FIG. 1. On the writing strip there is recorded a portion of a masspectrum for copper. The mass through-put speed in the masspectrometer amounted to 10 minutes per mass octave; the time over which the impulses were averaged amounted with the employed rate meter to 0.1 seconds, and the advance of the writing strip amounted to 10mm/sec.

Figure 4:
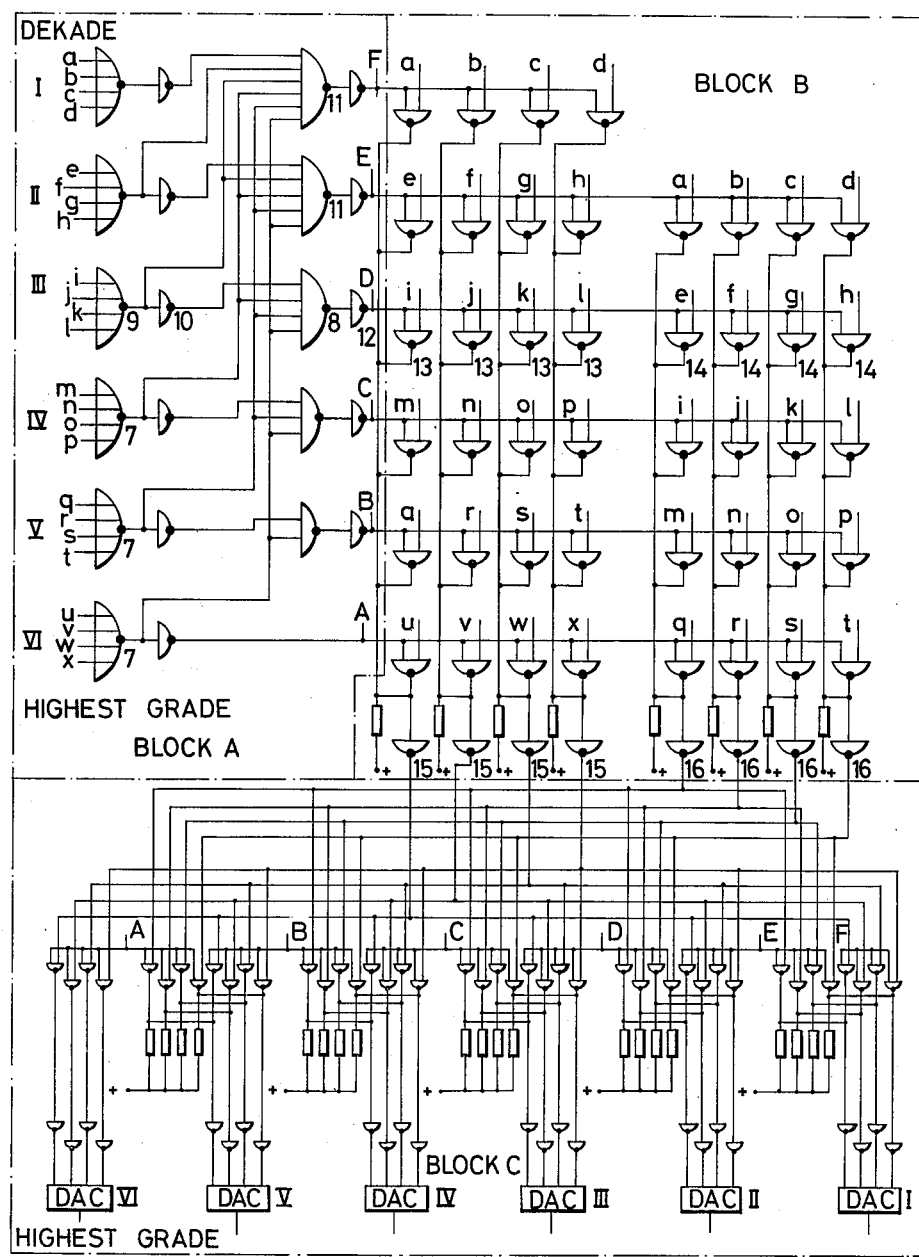
FIG. 4 shows a circuit for ordinarily selecting the respective two highest value decades with following circuit arrangement for analogizing the digital individual signals.

FIG. 4 shows an embodiment of a control arrangement 2 according to the invention for the automatic selection of the respective two highest value decades with subsequent control arrangement 3 which latter comprises the digital analogous converter DAC I to DAC VI. As will be evident from FIG. 4, the control arrangement is subdivided into three blocks. Block A serves for receiving the signal coded in the BCD code. This signal is composed of six digital individual signals according to the decades I to VI, the decade I being the lowest and the decade VI being the highest value decade. The digital individual signal of the decade I consists of four input signals $a,b,c,d$, the digital individual signal of the decade II from the input signals $e,f,g,h$, etc., while the input signals respectively correspond to four bit of the signal coded in the BCD code.

In Block A, it is checked which of the six possible decades is the highest value decade of the signal and thus also of the measured variable, in other words, it is checked which decade starting from the highest value decade VI comprises individual signals with an information differing from zero. A selective signal corresponding to the highest value decade is then passed to Block B. As a result thereof, in Block B, the input signals of the two highest value decades are released for transfer to Block C where for purposes of analogization they are conveyed to the digital analogous converter DAC corresponding to the two highest value decades.

As an example, there will now be described the course of the digital idividual signal of the decade III with the input signals $i,j,k,l$. In this connection it is assumed that this digital individual signal simultaneously represents the highest value information of the signal coded in the BCD code. The digital individual signals of the decades IV, V and VI will then contain the information logic 0. As a result thereof, from the control elements 7 in the voltage paths of the decades IV, V and VI after a "not-or" logic configuration of the input signals of these decades, a logic 1 is reported to the NAND gate 8 in the voltage path of the decade III. Inasmuch as at least one of the input signals $i,j,k$, or $l$ of the digital individual signal of the decade III differs from zero, a logic 1 is reported via the control element 9 in the voltage path of the decade III in which a not-or logic typing of the input signals $i,j,k,l$ is effected and via the inverter 10 and the NAND gate 8. At the same time, the NAND gates 11 in the voltage paths of the decades I and II are blocked by logic 0. Inasmuch as at the NAND gate 8 there stands 4 times logic 1, the selective signal D=logic 1 is via the inverter 12 conveyed to Block B. The selective signals ABCDEF in the voltage paths of the corresponding decades VI,V,IV, II, I are logical 0.

In view of the selective signal D, in Block B, the input signals $i,j,k,l$ of decade 3 and the input signals $e,f,g,h$ of the decade 2 are free via gates 13 and 14 and from here are conveyed to the common exits 15 and 16 and then are in block C conveyed to the digital analogous converter DAC III and DAC II.

With further reference to FIG. 4, each of the groups of signals for the respective decades is supplied to a respective NOR gate with the output of each NOR gate being supplied to an inverter. The outputs of the NOR gates are each connected to one input terminal of a NAND gate pertaining to each of the decades of lower value. Further, the output from each of the aforementioned inverters of decades I through V is connected to a further input of the pertaining NAND gate.

Each of the last mentioned NAND gates has the output connected through a respective inverter with one input of a group of NAND gates equal in number to the number of inputs to the respective NOR gate. Thus, in respect of decade III of FIG. 4, NOR gate 9 has input terminals $i,j,k$ and $l$. The output of NOR gate 9 is connected to one input of each of the NAND gates 11 of decades I and II. It is also connected through inverters 10 with other input of NAND gate 8 pertaining to decade III. The other inputs of NAND gate 8 are connected to the outputs of the NOR gates pertaining to decades IV, V and VI.

The output from NAND gate 8 of decade III is supplied through inverter 12 to one input of each of the NAND gates 13 and 14. The other input to each of NAND gates 13 is derived from the inputs to NOR gate 9 and the other inputs to NAND gates 14 are derived from the inputs of the NOR gate pertaining to decade II.

A terminal D is also provided at the output side of inverter 12 and this is connected to the terminal marked D in block C of FIG. 4.

The outputs of gates 13 and 14 are biased high and will go low when logic 1's are supplied to both inputs of a gate. When a gate 13; for example, the gate to which terminal $i$ is connected; is supplied with 1's to both terminals and the output goes low, the input to the lefthand one of inverters 15 goes low and the output thereof goes high and this, in turn, will cause the NAND gate indicated at 15' to have two logic 1's supplied to the inputs thereof, one from the aforementioned gate 15 and the other from terminal D whereby the output of gate 15' will go low. This output is inverted by inverter 15'' and is supplied as a positive signal to the converter DAC III.

In a similar manner, any logic 1's supplied to terminals e,f,g and h will result in one or more logic 1's supplied to the converter indicated DAC II.

Only a single one of terminals A,B,C,D,E,F goes to logic 1 at any one time and each thereof controls values from the respective decade and the decade next lower in value.

The printing mechanism illustrated in FIG. 5 in principle consists of printing form 17 arranged in a decade manner adjacent to each other. Each of the printing forms 17 is triggered through a non-illustrated control arrangement and serves to illusrate as number the respective value of the digital individual signal which corresponds to the respective one of the decades of the signal coded in the BCD code. This number is as indicated in FIG. 6, conveyed by means of a dyed band 18 to a printing strip 19 shown in FIG. 7. To this end the printing strip 19 is by means of a pressing plate 20 pressed against the printing forms 17. The printing forms 17 are to this end stepwise rotatable independently of each other, and, as indicated in FIG. 5 by way of example in connection with the printing form corresponding to the lowermost decade are arranged in the direction of rotation of the printing forms at a distance corresponding to the width of the step. As will be likewise evident from FIG. 5, the numerical indications on the printing forms are according to the invention at the same time arranged in the sequence corresponding to their value in the decimal system and are laterally to the direction of movement of the printing forms offset relative to each other. In this way, as will be evident from FIG. 7, the value of the printed number with the exception of the number itself can also be ascertained from its position on the printing strip. FIG. 7 shows that respectively only the three highest value numbers of the decimal number will be printed in an analogous manner with regard to the recording on the writing strip illustrated in FIG. 2.

It is, of course, to be understood that the present invention is, by no means, limited to the specific showing in the drawings but also comprises any modifications within the scope of the appended claims.

What is claimed is:
1. An apparatus for developing a printed display of a variable transformed into a digital voltage or current signal while a digital signal is so coded in a code adapted to a predetermined numerical system and consists of digital individual signals which correspond to groups of a predetermined numerical system which comprises in combination: means for measuring instantaneous values of the variable and for encoding the signals thus developed in a binary code in which individual signals correspond to differently valued groups of a numerical system, and a type printing mechanism including means establishing operative connection with said means for measuring instantaneous values of the variable and for encoding the signals thus developed in the binary code to receive the encoded signals in conformity with the respective group, said mechanism being operable to register and display the values corresponding to the respective groups in adjacent relation in a sequence corresponding to the value of the groups and also corresponding to the values within each group, said printing mechanism comprising a plurality of printing heads, each having numerals thereon distributed circumferentially of the respective head, each head being rotatable individually, and means for rotating the heads in conformity with the value to be printed thereby.

2. An apparatus in combination according to claim 1 in which said heads are coaxial and are operable for printing on one and the same chart, and the numerals on each head are arranged in a helical path thereon.

3. An apparatus in combination according to claim 1 which includes circuit means to which the coded signals are supplied and which circuit means includes means for selecting the individual signals corresponding to the highest valued groups, and means to feed the selected signals to the printing mechanism.

* * * * *